United States Patent [19]

Jacobs et al.

[11] 4,297,075
[45] Oct. 27, 1981

[54] AUTOMATIC STORM PROTECTION CONTROL FOR WIND ENERGY SYSTEM

[76] Inventors: Marcellus L. Jacobs; Paul R. Jacobs, both of Rte. 13 - Box 722, Fort Myers, Fla. 33908

[21] Appl. No.: 38,885

[22] Filed: May 14, 1979

[51] Int. Cl.³ .................................................. F03D 7/04
[52] U.S. Cl. ........................................ 416/14; 416/140
[58] Field of Search ................. 416/9, 13, 14, 32, 140

[56] References Cited

U.S. PATENT DOCUMENTS

| | | | |
|---|---|---|---|
| 1,698,709 | 1/1929 | Bucklen et al. | 416/13 |
| 1,818,672 | 8/1931 | Bucklen | 416/13 X |
| 1,930,390 | 10/1933 | Jacobs | 416/13 |
| 2,207,964 | 7/1940 | Albers | 416/13 |
| 2,307,622 | 1/1943 | Edens et al. | 416/14 |
| 3,891,347 | 6/1975 | Jacobs et al. | 416/32 |
| 4,088,420 | 5/1978 | Jacobs et al. | 416/9 |

*Primary Examiner*—Everette A. Powell, Jr.
*Attorney, Agent, or Firm*—Shoemaker and Mattare, Ltd.

[57] ABSTRACT

A wind energy plant is protected against damage from high winds by permitting the propeller assembly thereof to fold with respect to the tail assembly of the plant when the wind velocity with respect to the plant exceeds a predetermined value. Return of the propeller assembly to a wind facing orientation is controlled to prevent oscillating or whipping in gusty or turbulent winds. A safety system is included to control plant shutdown, and automatically shuts down the plant if the plant is being subjected to excessive vibration.

7 Claims, 11 Drawing Figures

AUTOMATIC STORM PROTECTION CONTROL FOR WIND ENERGY SYSTEM

BACKGROUND OF THE INVENTION

The present invention relates in general to wind energy plants, and, more particularly, to storm protection of wind energy plants.

Changing the pitch, or angle, of air foil type propellers for speed regulation has long been in use for preventing overspeeding in normal winds and light storms. However, most of such governing devices, if they change the pitch sufficiently to prevent overspeeding in winds above 50 to 60 miles per hour, when the blade angle to the wind is increased beyond a certain point in order to prevent any further increase in speed, the outer portion of the propeller begins to act as a high speed centrifugal "paddle" fan. Back pressures of 100 miles per hour or more are thus created against the back portions of the propeller and this "back pressure" in turn allows tremendous pressure buildup against the front side of the revolving propellers, often breaking them as well as subjecting the entire plant and tower to severe storm damage. Winds exceeding 100 miles per hour are encountered at the tops of towers, and a successful wind energy system must be automatically controlled when such storms strike.

The inventors of the hereinafter disclosed invention also have patents relating to wind energy plants having the propeller axis offset from the vertical. Such patents include U.S. Pat. No. 4,068,131. Furthermore, the present inventors also have patents wherein the mast of a wind electric plant is offset from the center of the gear assembly, see, e.g., U.S. Pat. No. 4,088,420.

While the devices disclosed in the just-mentioned patents afford protection to the wind energy plant in storms wherein wind velocities do not exceed about 60 miles per hour, and are thus adequate under most conditions, there are storms in which wind velocities exceed 60 miles per hour, especially at the heights of the propellers of the wind energy power plants. As used herein, the term "high winds", or the like, will refer to wind velocities with respect to the wind energy plant of about 60 miles per hour and above. Even though such storms are rare in many areas, even the slimmest possibility of such a storm should be accounted for.

A drawback to presently known wind energy power plants is that protection against high winds, that is, winds in excess of 60 miles per hour, is either not possible at all, or can be accomplished only at considerable expense. Accordingly, all known wind energy power plants either are not protected against high winds, or are protected inadequately, or are extremely expensive.

During storms, ice may form on the plant propeller blades creating a severe unbalance. The rotational velocities of the blades in a typical wind power plant are such that blade unbalance can set up severe vibrations in the plant. These vibrations can be serious enough to damage or even destroy a plant unless the plant is shut down. Known plants have no means of automatically shutting down the blades in a manner which, itself, does not present a possibility of damaging the plant. A shutdown which is too rapid may cause severe damage to the plant. As ice formation on propeller blades is a possibility in storms in many areas, and in some storms in all areas, complete storm protection for wind energy plants should account for this contingency, yet known plants do not, and thus have serious drawbacks.

Yet a further drawback to known plants is the uncontrolled manner in which manual shutdown can be effected. If the manual shutdown is not controlled properly, it is possible for an operator, either through inexperience or panic, or the like, to shut down the plant too rapidly in a storm condition, thereby causing the plant to be severely damaged, if not destroyed, due to the wind pressure placed on the blades as they slow down. Thus, complete storm protection for a wind energy plant should provide control over manual shutdown so that operation also is protected.

There is, therefore, a need for a means of protecting wind energy power plants against high winds which is reliable, yet inexpensive and easily installed.

There is also a need for a device which automatically shuts down a plant in a controlled manner if that plant is being subjected to excessive vibration, and which controls plant manual shutdown.

SUMMARY OF THE INVENTION

The device involving the teachings of the present invention reliably, yet inexpensively, protects a wind energy plant against high winds.

The device is used on wind energy plants of the type disclosed in U.S. Pat. No. 4,088,420, wherein the propeller axis is offset from the vertical and the mast pivot axis is offset from the center of the gear assembly. Attention is directed to this patent, as well as U.S. Pat. No. 4,068,131, for a disclosure of a hypoid gear drive assembly for a propeller assembly of a wind energy system. The disclosure and discussion of U.S. Pat. Nos. 4,088,420 and 4,068,131 are accordingly included herein by reference to these patents. It is also noted that these just-referenced patents disclose a governor arrangement for feathering the propeller blades and thereby changing the pitch of the blades in response to wind velocity. A further pitch adjusting governor arrangement is shown and described in U.S. Pat. No. 2,505,969.

The device includes means for folding the propeller axis and gear case assembly to one side when excessive wind pressure against the propellers develops in very high wind storms of 50 to 100 miles per hour or more. The device herein disclosed accordingly relies on a variable pitch governor to control propeller speed up to wind speeds of about 50 miles per hour, and thus the wind plant continues to secure full power output even though the wind is considerably stronger than required to secure maximum power, which is usually and preferably realized at 25 to 35 miles per hour. During the wind storms of higher velocity, in the 50 to 100 plus mile per hour range, the damaging pressures explained above create a considerable pressure against the propeller and tower structure, often destroying or severely damaging known structures. In the presently disclosed device, this wind pressure increase is used to swing the propeller axis around out of the wind. Under normal operation in winds up to 50 miles per hour, the variable pitch speed control prevents overspeeding and allows the production of full power, but above that wind velocity, the device of the present invention uses the "air break-paddle effect" of the propellers to create the required folding pressure without strain on the plant or tower structure. Thus, a wind energy plant embodying the teachings of the present disclosure will reliably deliver full output even in storms having very high and gusty winds.

The device includes a hinge means connecting the gear assembly to the tail section of the plant so that the gear assembly can pivot with respect to that tail section. A spring loaded snubber that produces snubbing action only when the vane is returning to normal operating position after folding out connects the gear assembly to the tail section. The snubber permits relief of excessive wind pressure on the propellers above that required to produce full energy output from the plant alternator, or full mechanical power from a vertical drive shaft, as the case may be.

The back pressure that is applied by the wind to the propeller system will not fold the propeller system (together with the gear case assembly) until full power is first developed by the propellers, after which, increased wind pressure applied to the propellers by excessive winds and/or storms will fold the operating plane of the propellers around to the side. This folding of the propellers reduces the contact area of those propellers with the wind to prevent any increased pressure against the propeller system, power mechanism and supporting tower. This storm safety control means is preferably used with a means which prevents any excessive propeller speed in strong winds by automatically changing the pitch, or angle of the propellers, to reduce their contact area with the wind when the speed exceeds a preset rate. An automatic pitch change centrifugally operated speed governor can prevent speed increases above a preset rpm through wind speeds of 30 to 50 miles per hour. However, if the propellers are turned at a sharp angle with their flat power face nearly parallel to the wind direction in stronger winds of 60 to 100 miles per hour, each propeller blade acts as a centrifugal fan to restrict rotation, as the outer ends are traveling at speeds of about 100 miles per hour or the like. Such retarding action creates an increased pressure from the wind, pushing back on the propeller hub and gear case. This increased wind pressure causes an offset propeller hub axis to swing around the vertical axis thereof (i.e., the vertical pinion shaft in the tower), thus reducing the wind pressure against the propellers, giving positive, automatic and complete storm damage protection to the entire plant and tower. Full energy output is maintained in all strong winds in storms with just enough wind pressure being applied to the propellers to maintain full power output while at the same time giving complete storm protection.

The snubber action used in the herein disclosed device allows the plant to swing around quickly from sudden gusts of high winds as there is no snubber resistance to the folding action of the propellers. The slow return action, however, takes place when the propeller and gear case assembly start swinging back into the normal power postition facing the wind. This snubber action prevents any oscillating, or whipping, in turbulent or gusty winds often experienced in storms. The propellers can fold quickly out of the wind to prevent wind pressure damage but must return back into wind slowly, thus preventing any oscillation or swinging damage to the unit or extra strain on the tower. This folding action permits the use of a disc brake control on the pinion drive shaft to stop the plant rotation by a hand control at the tower base. When the brake is applied and the propeller slows down, storm pressure will brake the blades as they flatten out to wind, however, the swing action produced by the device of the present invention makes this brake stop possible.

As just noted, the storm protection means disclosed herein permits use of a simple disc brake attached to the high speed pinion shaft at the alternator to stop the plant at any time desired, even during wind storms. Application of the brake to slow the speed of the propellers in a wind of 40 miles per hour or higher may break or otherwise damage those propellers because the added pressure against the propellers, when slowed down while being stopped, causes the governor to flatten the propellers against the wind for maximum wind pressure. The propeller blades are edgewise to the wind direction in velocities of above 30 miles per hour, even though delivering full power, but when the brake slows the rpm of the propellers below the point in which they "feather" (change pitch), the propellers are forced into maximum power pitch (flat to the wind) and simply are pushed into the tower, thereby destroying or damaging both the plant and the tower.

The storm protection means disclosed herein allows positive variable pitch speed control which is necessary for proper regulation in normal wind speeds with the added protection of folding the unit out of the excessive wind pressure position during high wind storms.

It is noted that many wind plants, including water pumping multiblade windmills, use "wind pressure" to fold them out of the wind for speed control. However, in the present device, because of and by the action of the offset hypoid gear design employed, the propellers of the present device can be kept facing directly into the wind over the entire power producing range of wind speed up to 50 to 60 miles per hour and then, at that point, excess wind pressure can be used against the propellers, that is created solely by the "paddle effect" resistance to any increase in speed of the propellers, for folding them sufficiently out of the wind to prevent storm damage to plant and tower.

Thus, it is not just a "wind pressure" folding method but a much improved system, as keeping the propellers facing directly into the wind delivers far more power output in gusty winds, instead of having the plant folding in and out of operating position constantly as a means of speed control. It takes this combiantion of variable pitch governor speed regulation to give maximum power during most of the wind periods throughout the year but still have a storm protection feature for the few hours per year when the winds may exceed the 50 to 60 miles per hour during extremely high winds and storms. Such periods seldom occur each year, but the wind energy system must be protected against them.

The normal back pressure from the offset propeller axis is balanced by the counter torque of the hypoid gear drive design until maximum power is produced in wind velocities of 25 to 35 miles per hour. Above that wind speed, up to a range of about 50 to 60 miles per hour, the normal centrifugal action governor control regulates the speed through pitch change control, thus, the plant faces fully into the wind all the time except during the very few times when extreme winds occur.

Therefore, the device disclosed herein is for a storm control that applies to a particular hypoid gear drive, and is not applicable to all plants. Many wind operated devices have used just the wind pressure for their speed control, and there is nothing claimed herein on the mere folding of propellers around out of the wind per se. The invention described herein is embodied in a means having the advantage that a propeller drive wind energy system will produce considerably more energy if it faces directly into the wind during the majority of operating hours per year instead of swinging back and forth in gusty winds that prevail most of the time, and such a wind energy system can only do this with a variable pitch propeller speed control that regulates the speed during most of the wind periods each year. Thus, it takes the particular combination of variable pitch control and storm protection during the few hours of excessively high winds provided by the herein described invention wherein the propellers are folded to one side to relieve wind pressure in excessively high winds.

The device of the present invention also includes means for automatically controlling plant shutdown, be that shutdown automatic or manual.

The purpose of the automatic plant shutdown means of the presently disclosed wind energy system is to prevent plant and tower damage in the event of a storm or any other conditions creating a serious out-of-balance of the propellers. Two systems are disclosed hereinafter for accomplishing this function. In one system, a mercury switch controlled electromagnet solenoid trips a "drum cable release" to permit a snubber spring to operate a caliper brake unit. In a second system, gravity action on a weighted vertical bar that is released from a support when serious vibration of the propellers shake the tower causes that bar to release a caliper brake actuating handle so the snubber will actuate the brake at a controlled rate. The weighted bar system is used when the wind energy system is used for water pumping, or other such purposes and does not operate a generator. A wind energy electricity system has the electricity to operate the electromagnet solenoid, and thus is best adapted for this type of safety release of the automatic brake.

Yet another feature of the presently disclosed device includes a controlled manual shutdown. The spring-operated oil filled snubber is used to actuate the brake means in the manual shutdown as well. Such control is necessary because high speed propellers, carrying thousands of pounds of "centrifugal energy" (weight), when stopped too quickly will place a tremendous strain on gears and drive parts. If the operator applies the caliper disc brake directly by pulling down on a control cable with a hand winch, that operator could apply braking power too abruptly and strain or damage the gear drive train and other parts in overcoming weight inertia in propellers, governor hub and drive train. It has been noted that an average operator has difficulty in properly applying the braking pressure so as not to strain the equipment. Some operators tend to turn the brake cable winch too fast and thus strain the drive train, while other operators tend to crank too slowly and, in strong winds, allow the plant to maintain too much speed, with partial brake pressure, overheating the brake system. By including a positive, yet exact, speed reduction of the high speed rotor shaft to which the disc brake is attached, the presently disclosed system insures proper braking shutdown entirely independent of operator skill. All the operator need do is unwind the crank winch to stop the plant, and the automatic spring snubber action controls the degree of braking that is applied. A safe stop is thus insured.

OBJECTS OF THE INVENTION

It is, therefore, a main object of the present invention to provide a wind energy plant with protection against damage from high or gusty winds.

It is another object of the present invention to provide a wind energy plant with protection against high or gusty winds which is reliable yet inexpensive to install.

It is a further object of the present invention to provide a wind energy plant with protection against high or gusty winds which permits full power output from the plant under a wide range of wind velocities.

It is yet another object of the present invention to provide a wind energy plant with protection against high or gusty winds which permits use of a simple disc brake to stop the propellers during wind storms.

It is still a further object of the present invention to control shutdown of a wind energy plant.

It is still another object of the present invention to automatically shut down a wind energy plant in a controlled manner in the event of excessive plant vibration.

These together with other objects and advantages which will become subsequently apparent reside in the details of construction and operation as more fully hereinafter described and claimed, reference being had to the accompanying drawings forming part hereof, wherein like reference numeral refer to like parts throughout.

DETAILED DESCRIPTION OF THE INVENTION

Figures 1, 3:
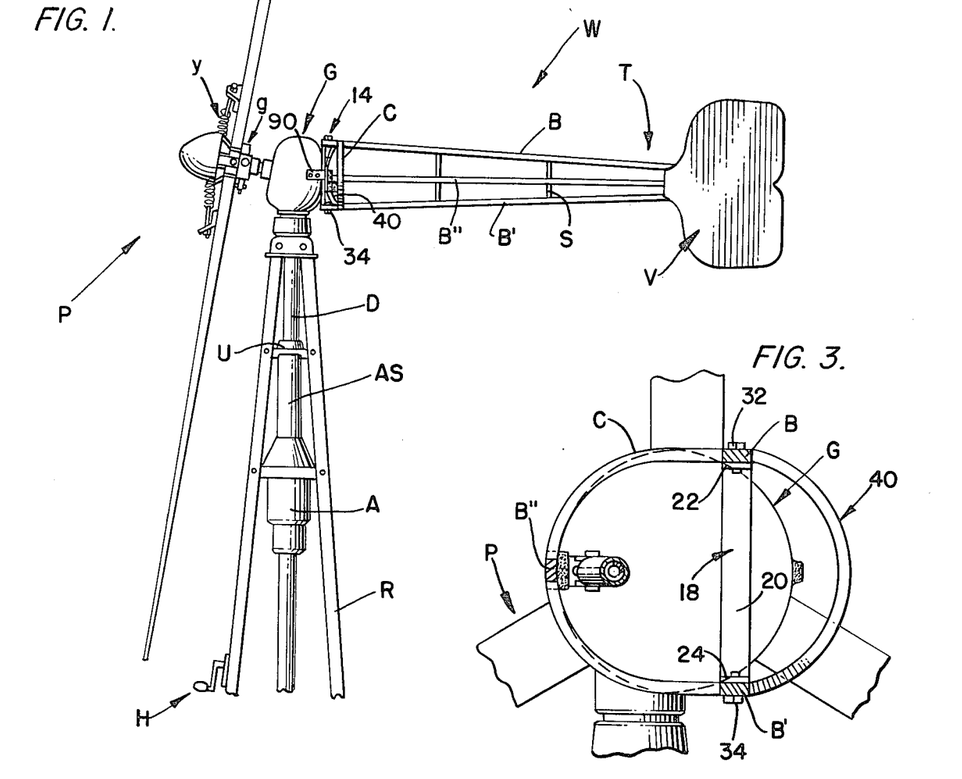
FIG. 1 is an elevation view of a wind energy plant which includes a storm protection means embodying the teachings of the present invention.
FIG. 3 is a view taken along line 3—3 of FIG. 2.
Figure 2:
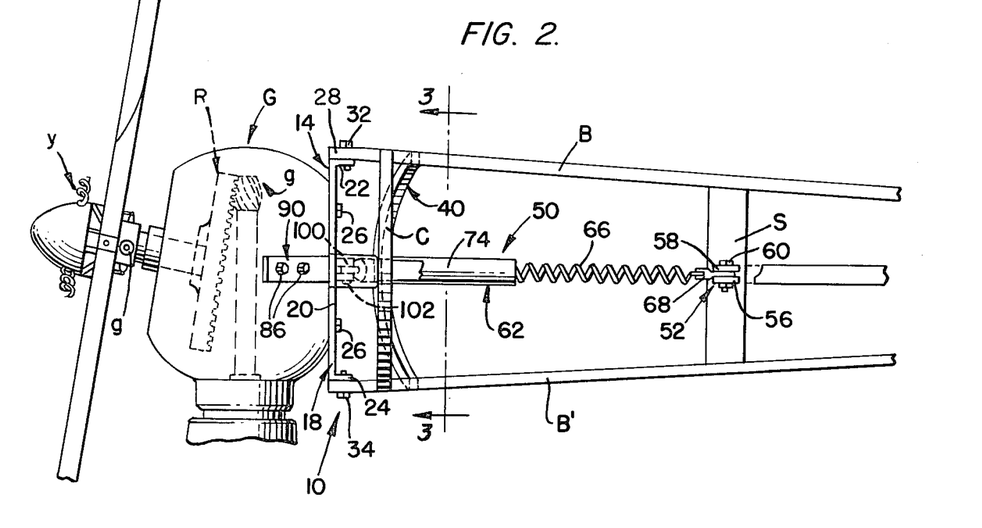
FIG. 2 is a plan view of the wind energy plant shown in FIG. 1.

Shown in FIG. 1 is a wind energy plant W embodying the teachings of the present invention. The plant W is mounted on suitable corner rails R and includes an alternator A, an alternator armature shaft AS and a drive shaft D connected to the shaft AS by a universal joint U. A gear assembly G is pivotally mounted on the plant by a mast pivot mount M, best shown in FIGS. 4 and 5, which includes a hypoid gear drive assembly h which offsets the center of the gear assembly from the center of the tower as fully described in U.S. Pat. No. 4,088,420, which is fully incorporated into this disclosure by reference thereto. A brake means H is mounted on the plant for stopping the propeller should the need arise. It is here noted that the pinion gh for the hypoid gear drive assembly shown in FIG. 2 is located near the top of ring gear R for several reasons. The top located pinion is not submerged in oil in the gear oil sump. In cold weather, when the plant is starting to operate, friction drag of the pinion in cold oil would create a power loss and hinder startup of the propellers, especially in very cold weather. Furthermore, an oil seal is not needed with a top located pinion, nor is an oil tight sleeve around the pinion shaft needed with such a location.

The plant W includes a tilted propeller P and a tail section T connected to the gear assembly. The plant further includes a governor g for controlling the pitch of the propeller blades which further includes yieldable means y and which is fully described in U.S. Pat. Nos. 4,068,131 and 2,505,969. The tail section includes a pair of main braces B and B' and an intermediate brace B" all of which are rearwardly converging to a rear tail vane V from the gear assembly G. The braces B and B' are interconnected by vertical struts S, and the intermediate brace B" is connected at the rear end thereof to the tail vane and at the front end thereof to an arcuate cross brace C which is connected at the top thereof to main brace B and at the bottom thereof to main brace B'. The connection of the tail section to the gear section will be more fully discussed below. As aforediscussed, propeller P is wind resistant by feathering and due to the offset nature of the mast pivot mount M. While this structure is effective in permitting full power output for usually encountered wind velocities, high winds, as may be encountered in severe storms, may damage even a plant including these structures.

Figure 4:
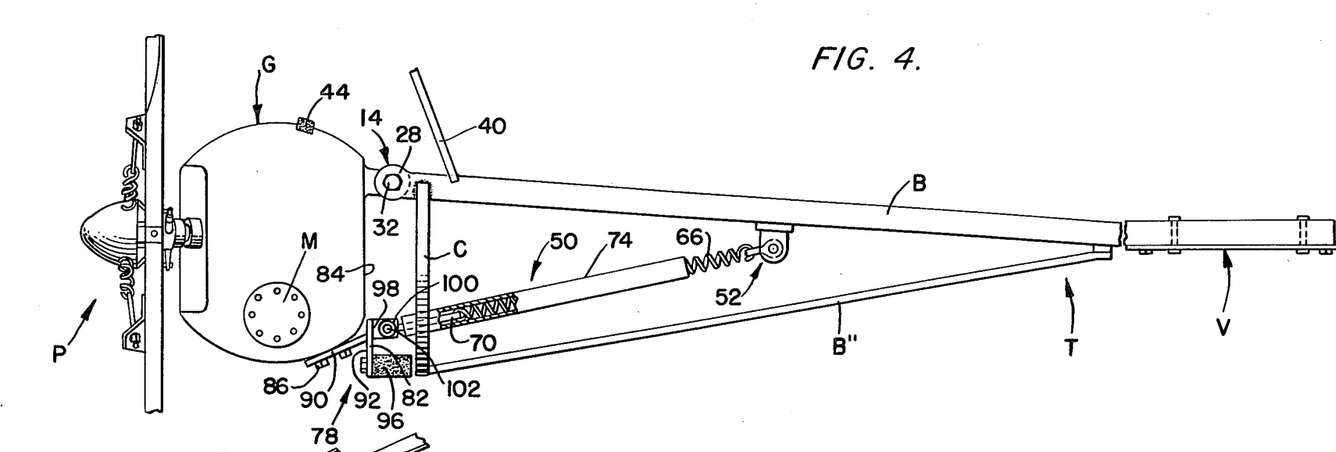
FIGS. 4 and 5 are plan views of a wind energy plant in two positions illustrating the operation of the storm protection means embodying the teachings of the present invention.

Accordingly, the plant W further includes a storm protection means 10 which includes a hinge means 14 connecting the plant gear assembly to the tail main braces. The hinge 14 includes a U-shaped carriage bracket 18 having a central portion 20 and end portions 22 and 24 with the central portion being attached, as by bolts 26, to the gear assembly G. Each main brace has a lug coupler 28 thereon and hinge pins 32 and 34 pivotally connect the carriage bracket to the main braces and thereby connect the gear assembly G to the tail section T. The gear assembly, and hence the propeller P, are therefore pivotally connected to the tail section as can be seen in FIGS. 4 and 5 where the gear assembly has rotated about the hinge 14 from the FIG. 4 orientation with respect to the tail section into the FIG. 5 orientation with respect to the tail section.

A stop arm 40 is mounted on the main braces B and B' to prevent the gear assembly from rotating beyond a predetermined position. Due to the tilted attitude of the propellers (see FIG. 1), these propellers will contact the plant frame if the gear assembly is permitted to rotate too far. Accordingly, orientation of the stop arm 40 is positioned to permit maximum rotation of the gear and propeller assemblies without endangering the propellers due to contact with the remainder of the plant.

Figure 5:
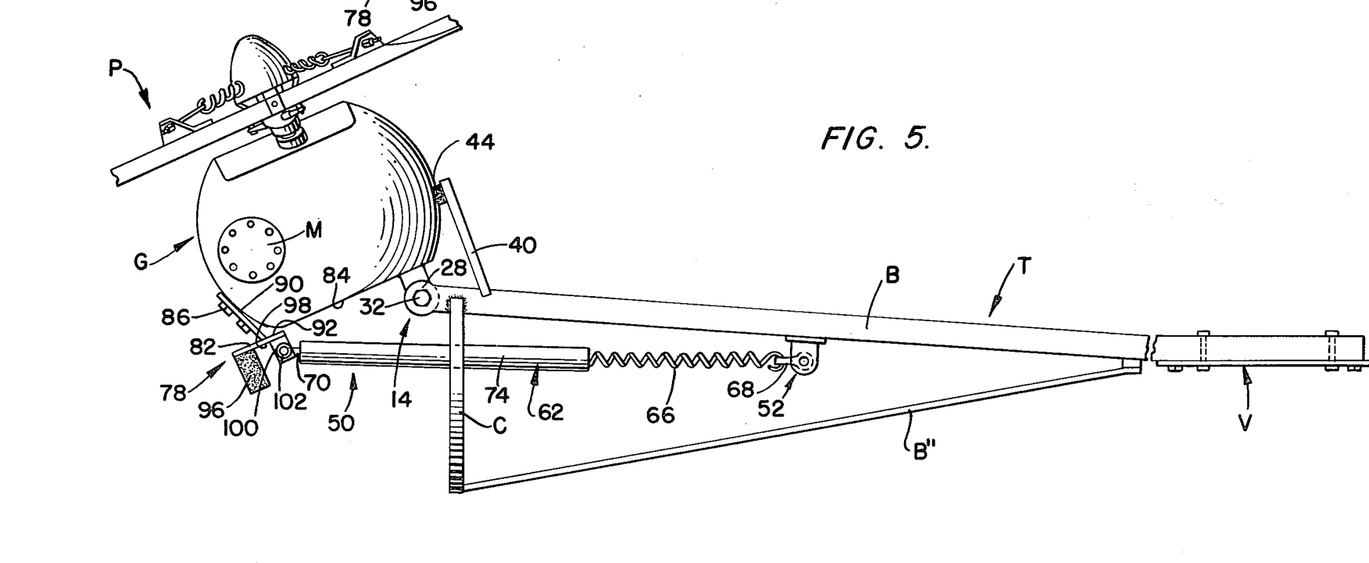

As indicated in FIGS. 2 and 5, the stop arm 40 is arcuate, and the gear assembly G includes an impact absorber 44 mounted thereon to contact the stop arm and thus cushion any impact between the gear assembly and the stop arm. Such impact cushioning means may be important in extremely high and gusty winds.

The storm protection means 10 further includes a one-way snubber assembly 50 for regulating the pivotal movement of the gear assembly about the pivot axis defined by the hinge pins 32 and 34 and the carriage bracket 18. The snubber assembly includes a bracket 52 mounted on one of the vertical struts S, preferably, that strut nearest the gear assembly, and having a pair of spaced flanges 56 and 58 extending horizontally and being oriented in horizontal planes. The flanges are in spaced parallelism with each other and have aligned holes defined therethrough for receiving a mounting bolt 60. The snubber assembly includes a spring loaded snubber 62 having a snubber spring 66 connected at one end to a rear eye bolt 68 which is anchored in the bracket 52 by the mounting bolt 60, and at the other end to a forward eye bolt 70. A damping cylinder 74 surrounds the snubber spring to be coaxial therewith and serves to damp the movement of the spring, as will be discussed below.

The forward eye bolt 70 is connected to an anchor bracket assembly 78 which is mounted on the gear assembly at a location remote from the hinge means 14 and with the mast pivot mount M interposed between the bracket assembly 78 and the hinge means 14. The anchor bracket 78 includes a base plate 82 extending essentially parallel with planar rear surface 84 of the gear assembly G, and spaced therefrom, and a bracket connecting arm 90 mounted, as by bolts 86, to the gear assembly G. The bracket connecting arm 90 is integrally attached to forward face 92 of the base plate 82 to be disposed at an angle therewith and to extend forwardly therefrom.

The base plate 82 is elongate and a stop pad 96, which is preferably rectangular and rubber, is mounted on rear face 98 of the base plate to extend vertically and is located to abut the cross brace C as indicated in FIG. 4 when the propeller rotational axis is aligned with the tail as shown in FIG. 4.

A mounting flange 100 is also mounted on the rear face 98 of the base plate 82 to extend rearwardly therefrom. The forward eye bolt 70 is pivotally attached to the mounting flange 100 by a pivot pin 102 thereby attaching the snubber assembly to the gear assembly on one side of the pivot axis defined by the mast mount M with the storm protection pivot axis defined by the hinge means 14 located on the other side of the pivot axis defined by the mast mount M.

The tension in the snubber spring 66 is adjusted so that the pivotal movement of the gear assembly G from the FIG. 4 orientation into the FIG. 5 orientation against the yielding portion of the snubber spring is controlled whereby even extremely high velocity and gusty winds will not cause the gear assembly to slam into the stop arm 40 with impact sufficient to damage the gear assembly or other parts of the plant.

The damping of the cylinder is adjusted so that the return motion of the gear assembly from the FIG. 5 orientation with respect to the tail to the FIG. 4 orientation with respect to the tail is closely controlled whereby the gear assembly will not be slammed into the cross brace C by the spring force of the snubber spring with sufficient force to damage any part of the plant W. The snubber assembly 50 thus controls and regulates the pivotal motion of the gear assembly in both the clockwise direction and the counterclockwise direction about the hinge means 14 as viewed from the top and as shown in FIGS. 4 and 5.

Because of the snubber assembly 50, even winds which move in very strong gusts are not likely to damage the plant W as both the wind caused pivoting and the snubber spring caused return movement of the gear assembly are closely controlled by the snubber assembly.

The wind energy plant W is therefore protected against damage due to normal winds by the offset pivotal axis defined by the mast mount M and against abnormally high winds, even gusts, by the snubber assembly 50.

It is noted that the snubber assembly 50 can use a snubber similar to snubbers used on storm doors, screen doors, and the like. The snubber assembly 50 differs from these devices only in the spring constants and damping constants used. Otherwise, the structure, function and operation of the snubber assembly spring and cylinder are similar to those just-mentioned snubbers.

Figures 6, 7, 8:
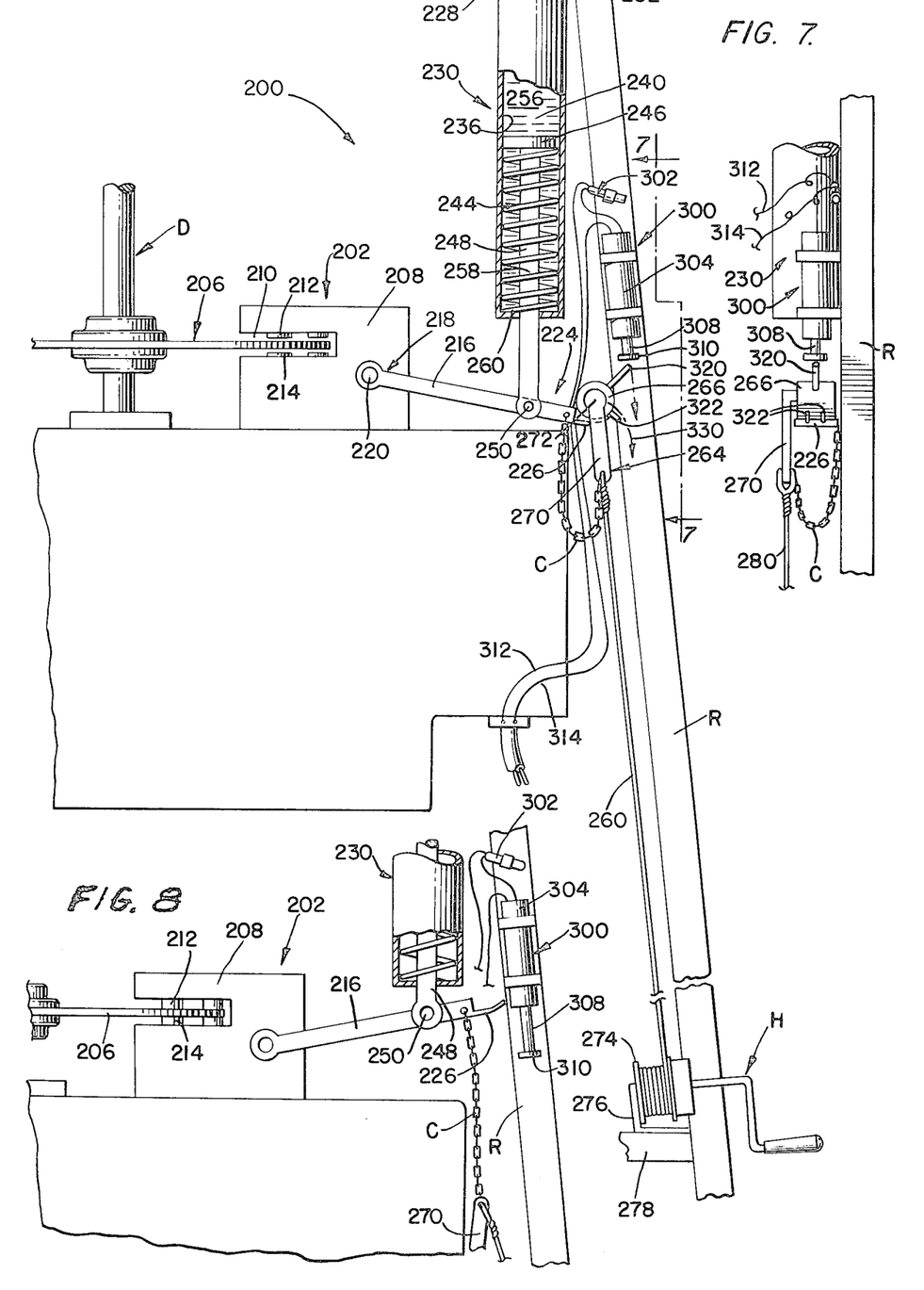
FIG. 6 is an elevation of a plant shutdown system embodying the teachings of the present invention.
FIG. 7 is a plan view taken along line 7—7 of FIG. 6.
FIG. 8 is a partial elevation view of the FIG. 6 shutdown system in the actuated position.

Shown in FIG. 6 is a supplementary safety means 200 for protecting a wind energy plant against damage from ice formation on the propellers. As ice chunks on the propellers can cause extreme vibration, a plant can be severely damaged in a very short time, and in fact, this damage can even, in severe cases, destroy the plant.

The safety means 200 includes a caliper brake 202 mounted on the tower adjacent the drive shaft D on a tower cross-brace, or the like. A brake disc 206 is fixedly mounted on the drive shaft D and extends radially outward therefrom to surround that drive shaft in a concentric manner. The caliper brake 202 includes a housing 208 having a gap 210 defined therein. A plurality of upper and lower friction pads 212 and 214, respectively, are mounted in the housing to be movable toward and away from each other in a clamping movement. Suitable gearing, or the like (not shown), can be included in the caliper brake to effect such clamping movement of the friction pads. The brake disc 206 is interposed between the upper and lower friction pads to be frictionally contacted thereby upon clamping movement thereof. Thus, clamping movement of the friction pads 212 and 214 causes frictional engagement between those pads and the brake disc 206 to stop rotation of that disc, and hence to stop rotation of the drive shaft D and the propellers of the wind plant. Thus, using the caliper brake, rotation of the propellers of the wind plant can be stopped.

An actuating handle 216 is pivotally mounted at proximal end 218 thereof to the housing 208 by a pivot pin 220, and is operably connected to the friction pads 212 and 214 via the internal mechanism of the brake to cause those pads to execute the aforediscussed clamping and unclamping movements upon pivotal movement of that handle. The handle extends away from the housing 208 and includes a distal end 224 having a detaining hook 226 thereon and curving outwardly therefrom.

A mounting bracket 228 is fixedly attached to one of the legs R to be essentially horizontally disposed and to be located above the brake 202. A brake actuating cylinder 230 is pivotally mounted at one end thereof to the bracket 228 by a pivot pin 232, and depends downwardly therefrom toward the brake 202. The cylinder defines a chamber 236 in which fluid 240, such as oil, or the like, is contained. A piston 244 having a piston head 246 and a piston rod 248 is slidably mounted in the cylinder so the rod 248 extends outwardly of the cylinder toward the actuating handle 216. One end of the rod is fixedly attached to the piston head, and the other end of the rod is pivotally attached to the actuating handle 216 via a pivot pin 250 at a location between the distal and proximal ends of that actuating handle. The piston head sealingly engages the inner surface of the cylinder to divide that cylinder into an upper chamber 256 and a lower chamber 258, but the cylinder has fluid passage means for permitting movement of the fluid 240 from the upper chamber 256 to permit upward movement of the piston head within the cylinder. The fluid passage means can be bypass passages on the piston permitting fluid to move into the lower chamber 258 at a controlled rate as the piston moves upwardly, or reservoirs located externally of the cylinder along with fluid control means fluidly connecting those reservoirs to the appropriate chambers of the cylinder. In any event, movement of the piston 244 axially of the cylinder 230 is controlled.

A spring 260 surrounds the piston rod within the cylinder 230, and yieldably urges the piston upwardly against the fluid in the upper chamber. The spring constant of spring 260 is selected so that, unless the piston rod 248 is constrained, that spring will cause the piston to move upwardly into the cylinder. In other words, the bias of the spring is not counterbalanced by the resistance of the fluid 240, and if the actuating handle 216 is not constrained, the cylinder 230 will lift the handle upwardly from the position shown therefor in FIG. 6 into the position shown therefor in FIG. 8.

The brake 202 is arranged so that upward movement of the actuating handle 216 results in clamping movement of the friction pads, thus stopping the rotation of the propellers in the manner disclosed above. In this manner, a plant stopping bias is always applied to the actuating handle 216 by the cylinder 230. This stopping bias is controlled by the fluid-spring combination, and thus will cause the propellers to stop in a closely controlled manner. The rate with which the cylinder mechanism lifts the handle 216 is controlled so that frictional clamping pressure is applied to the disc brake at a rate which safely stops rotation of the propellers.

A handle retaining means 264 is associated with the safety means for preventing the actuating cylinder 230 from moving the handle 216 upwardly to actuate the brake 202. The retaining means 264 includes a roller 266 releasably placed on hook 226. The roller is connected to an actuating cable 268 via a harness 270. The roller is rotatably retained in the harness by a pivot pin 272. The actuating cable is attached to the hand crank H located near the bottom of the tower via a drum 274 is wound about that drum. The drum is mounted on the leg R by a suitable mounting bracket 276 and a brace 278. A tether chain C connects the harness 270 to the arm 216 for a purpose to be discussed below.

The handle retaining means 264 resists the upward bias of the actuating cylinder 230 to keep the bracket 202 in an unapplied configuration when the roller 266 is seated in the hook 226. The cable 268 is thus tensioned and maintained taut during operation of the plant. However, when the plant is to be shut down for some purpose, operating a crank H releases the tension on the cable 268, thereby permitting the cylinder 230 to lift the handle 216 and apply the brake 202.

It is seen that actuation of the brake handle 216 is controlled by the cylinder 230. Thus, if the cable 268 is quickly untensioned, that cable will simply go slack and continued application of the brake will be controlled by the cylinder 230. Thus, the rate of application of the brake 202 has an upper limit as determined by the cylinder 230. However, the lower limit of the brake application is controlled by the retaining means 264. Thus, the propellers can be stopped as slowly as desired, but can be stopped only as quickly as the cylinder will permit during manual operation. The upper limit of the rapidity with which the propeller rotation is stopped during manual operation is closely controlled as this limit can be critical to plant integrity and safety.

As aforediscussed, ice formation on the propellers during a storm or the like may cause vibration of the plant which may damage or destroy the plant. Thus, during such conditions, it is safest to shut the plant down. An automatic shutdown means 300 is shown in FIG. 6 to include a mercury switch 302, or the like, mounted on the plant leg R and a solenoid 304 is connected thereto and mounted on the leg R adjacent the roller 266. As shown in FIG. 6, the mercury switch is mounted at a slight angle with respect to the horizontal. By selecting the angle of set, the trip-vibration level can be selected. The solenoid 304 has an actuating arm 308 with a flange 310 thereon. Suitable power means (not shown) such as a generator, or the like, which may be driven by the plant, is connected to the solenoid and switch via cables 312 and 314. The power system can also be self-contained, if so desired.

A contact flange 320 and a pair of pivot flanges 322 are mounted on the roller 266 to extend outwardly therefrom. The contact flange 320 is located to be contacted by the solenoid flange 310 upon actuation of that solenoid. Actuation of the solenoid by the mercury switch causes the arm 308 to extend outwardly thereby impacting the flange 320. This impact causes the roller to rotate in the clockwise direction in FIG. 6 causing the pivot flanges 322 to contact the outermost end of the hook 226. Continued rotation of the roller under influence of the solenoid actuator flange causes the roller to be unseated from the hook 266 as indicated by the arrow 330 in FIG. 6.

When the roller 266 rolls off of the hook 226, the arm 216 is released from the retaining force of the handle retaining means 264, and the handle actuating cylinder 230 causes the handle to move upwardly thereby actuating the brake 202 and stopping the rotation of the plant propellers in a controlled manner.

The mercury switch is set up to be sensitive to vibration of the plant, and to actuate the solenoid when plant vibration exceeds a certain level. Thus, plant vibration caused by ice formation on the propellers, or any other cause, will actuate the automatic shutdown means 300, and the propeller rotation will be stopped in a controlled manner, which control is effected by the control of the cylinder 230.

Thus, either automatic or manual plant shutdown is effected, and is carried out in a closely controlled manner so the propeller rotation can be stopped in a controlled manner no matter what the circumstances of the plant stoppage are.

The tether chain C prevents the loss of the roller 266 after the just-described emergency shutdown. After such a shutdown the roller can be replaced to reset the actuating means for future safety operation. The chain is connected to the outer end of the brake arm 216 to enable the operator, after the emergency storm shutdown, to again place the plant back into operation position by simply cranking down more of the control cable on the winch. This action will pull down the brake arm 216 permitting the plant to start operating again. The plant will not have the safety feature when thus operating, but will place the plant back in service until such time as the weather moderates permitting the operator to ascend the tower to replace the safety roller on the brake arm. Ice and storm conditions might prevent tower ascension for hours or days but could allow the plant to operate and produce valuable energy during the adverse weather. The propeller operating position for the safety means 200 is shown in FIGS. 6 and 7; whereas the safety means is shown in FIG. 8 in the vibration actuated position with the roller 266 unseated from the hook 226 by the mercury switch actuated solenoid 300.

Figure 9:
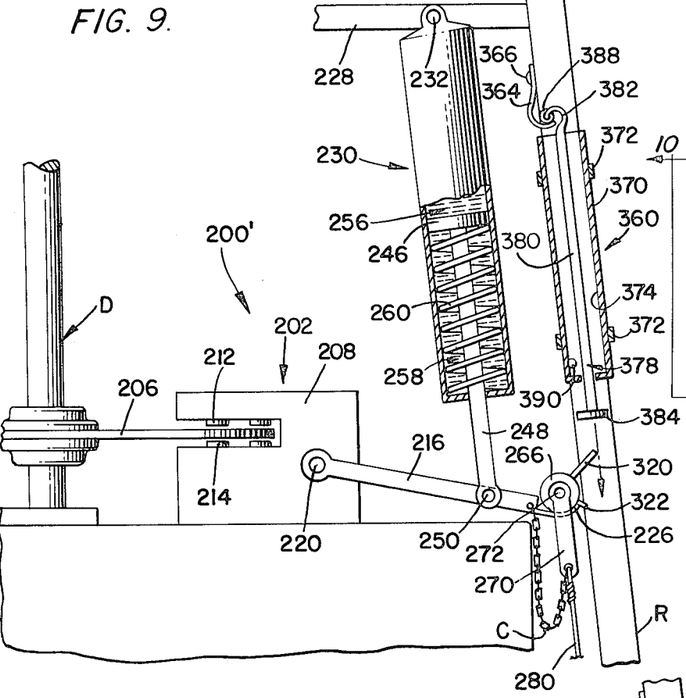
FIG. 9 is a partial elevation view of another form of the plant shutdown system embodying the teachings of the present invention.
Figure 10:
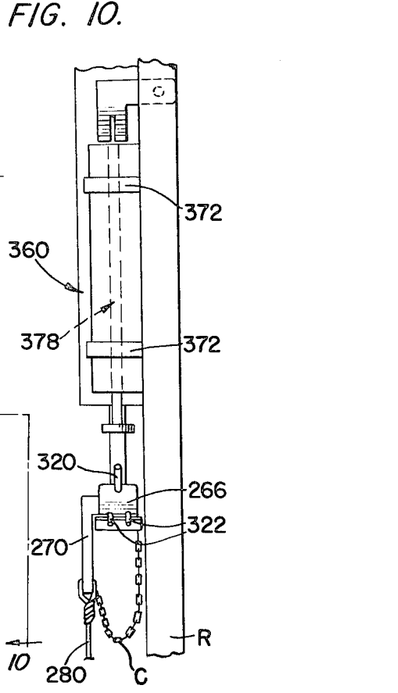
FIG. 10 is a view taken along line 10—10 of FIG. 9.
Figure 11:
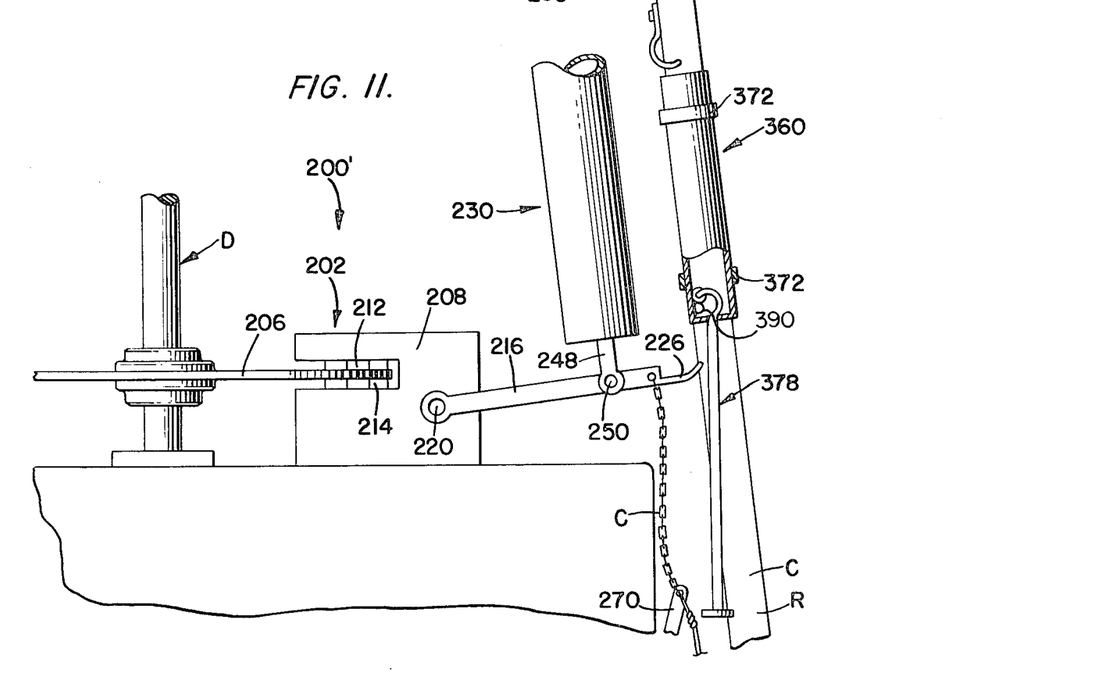
FIG. 11 is a partial elevation view of the FIG. 9 shutdown system in the actuated position.

Another form of the vibration actuated automatic shutdown means is shown in FIGS. 9–11, and is indicated by the reference numeral 200'. Shutdown means 200' is similar to shutdown means 200 except that the sloenoid-mercury switch of the shutdown means 200 is replaced by a releasable weight system 360 in the shutdown means 200'. The releasable weight system 360 is most suitable for use with wind energy plants which do not generate electricity; whereas the mercury switch-solenoid system is most suitable for use with wind energy plants which do generate electricity and can thus power the switch-solenoid system. However, the systems can be interchanged so long as suitable power sources are available for the switch-solenoid system.

The weight system 360 includes a mounting hook 364 affixed to the leg R by a fastener 366, or the like, and depending downwardly therefrom. A guide tube 370 is mounted on the leg R by bands 372 or the like, to be coaxial therewith. The guide tube 370 is hollow and has an axial internal bore 374 defined therein. A weighted piston 378 is movably received in the tube 370 and includes a shaft 380 having a hook 382 located on the upper end thereof and an impact flange 384 located on the lower end thereof. The hook 364 is slightly curved to be somewhat parabolic, whereas the hook 382 is sharply curved to be a segment of a circle and includes a thimble 388 on the outer end thereof. The hook 382 is supported on the hook 364 as shown in FIG. 9. A receiving ring 390 is located on the inside of the tube 370 near the bottom thereof.

Excessive vibration of the plant will jar the hook 382 off the hook 364, and the weight 378 will fall downwardly. The weight is guided by the tube 370, and the flange 384 impacts the flange 320 to unseat the roller 266 from the hook 226 to thereby release the handle 216 to be lifted from the FIG. 9 unbreaking position into the FIG. 11 breaking position in which the friction pads 212 and 214 clamp against the brake disc 206 to stop rotation of the drive shaft D in a controlled manner and hence stop the plant propellers in a controlled manner. The application of the brake 202 in both systems 200 and 200' is thus controlled by the cylinder 230 and is applied at a rate consonant with proper plant shutdown procedures.

The hook 382 is captured by the ring 390 to prevent the entire weight 378 from falling to the ground. The weight is reset by hand when the plant is to be restarted.

It is noted that in both systems, if there is a failure in the manual shutdown system, such as a break of the cable 280, or the like, the plant automatically shuts down at a controlled rate. Such a safety feature is thus added to the aforediscussed safety features. It is further noted that the hand crank H can have a ratchet-detent mechanism for further controlling manual plant shutdown.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A means for protecting a wind energy plant against damage thereto caused in high winds comprising:

a propeller assembly pivotally mounted on a wind energy plant support means;

a hypoid gear drive means mounting said propeller assembly on said support means, said gear drive means offsetting the pivot axis of said propeller assembly from the center of that propeller assembly;

a generator driven by said propeller assembly;

a variable pitch speed control governor on said propeller assembly for changing the pitch of propellers of said propeller assembly in response to wind velocity generated pressure against those propellers in a manner such that propeller speed is independent of any electrical load on said generator, said governor controlling propeller speed until the propellers of said propeller assembly reach maximum speed and feather, means for keeping said propellers facing directly into the wind over the entire power producing range of wind speed until said propellers feather;

pivot means pivotally connecting said propeller assembly to a tail assembly of a wind energy plant, said pivot means including pivot control means for actuating said pivot means after said propellers have feathered so that said propeller assembly will pivot with respect to said tail assembly and said plant support means under the influence of wind pressure exerted on said propeller assembly because of the combination of the hypoid gear drive propeller axis offset and the increased wind pressure created against the feathered propellers when the pitch angle of such propellers is no longer changed by the action of said variable pitch speed control governor; and said pivot control means further including a snubber assembly connected to said propeller assembly for controlling movement of said propeller assembly during a return movement of said assembly from a pivoted position back to a normal operating position, said snubber further including means for by-passing the control of said propeller assembly during movement of said propeller assembly from a normal operating position to said pivoted position.

2. The means defined in claim 1 further including a stop means on the plant for preventing pivotal movement of said propeller assembly beyond a predetermined position.

3. The means defined in claim 2 wherein said stop means includes a stop arm mounted on the tail assembly.

4. The means defined in claim 1 wherein said snubber assembly includes a snubber spring connected to the tail assembly and to the propeller assembly, and a cylinder surrounding said snubber spring to control return movement of the propeller assembly.

5. The means defined in claim 1 wherein said pivot means includes a hinge.

6. The means defined in claim 2 further including impact absorbers on said propeller assembly.

7. The means defined in claim 1 wherein the feathering speed of said propellers is reached in wind velocities above a range of about 50 to 60 miles per hour with respect to the wind energy plant.

* * * * *